United States Patent
Wellbrock et al.

(10) Patent No.: US 11,153,611 B2
(45) Date of Patent: Oct. 19, 2021

(54) CONTENT DELIVERY VIA HYBRID MOBILE NETWORK/BROADCAST NETWORK INFRASTRUCTURE

(71) Applicant: Verizon Patent and Licensing Inc., Arlington, VA (US)

(72) Inventors: Glenn A. Wellbrock, Wylie, TX (US); Tiejun J. Xia, Richardson, TX (US)

(73) Assignee: Verizon Patent ane Licensing Inc., Basking Ridge, NJ (US)

( * ) Notice: Subject to any disclaimer, the term of this patent is extended or adjusted under 35 U.S.C. 154(b) by 257 days.

(21) Appl. No.: 15/591,665

(22) Filed: May 10, 2017

(65) Prior Publication Data

US 2018/0332313 A1    Nov. 15, 2018

(51) Int. Cl.

| | |
|---|---|
| *H04N 21/2225* | (2011.01) |
| *H04N 21/488* | (2011.01) |
| *H04N 21/61* | (2011.01) |
| *H04N 21/462* | (2011.01) |
| *H04N 21/4363* | (2011.01) |
| *H04N 21/442* | (2011.01) |
| *H04L 12/64* | (2006.01) |
| *H04L 12/707* | (2013.01) |

(52) U.S. Cl.
CPC ..... *H04N 21/2225* (2013.01); *H04L 12/6418* (2013.01); *H04N 21/43637* (2013.01); *H04N 21/44209* (2013.01); *H04N 21/4622* (2013.01); *H04N 21/4882* (2013.01); *H04N 21/6118* (2013.01); *H04N 21/6125* (2013.01); *H04N 21/6131* (2013.01); *H04L 45/22* (2013.01)

(58) Field of Classification Search
CPC ......... H04N 21/41407; H04N 21/6131; H04N 21/47202; H04N 21/2225; H04N 21/43637; H04N 2/44209; H04N 21/4622; H04N 21/4882; H04N 21/6118; H04N 21/6125; H04L 12/6418; H01Q 21/0018; H04B 7/0686
See application file for complete search history.

(56) References Cited

U.S. PATENT DOCUMENTS

| | | | |
|---|---|---|---|
| 8,156,530 B2* | 4/2012 | Dey ................. | H04N 21/41407 725/62 |
| 10,009,085 B2* | 6/2018 | Da Silva ............. | H04B 17/318 |
| 10,200,213 B1* | 2/2019 | Mathews ............... | H04L 12/66 |
| 2007/0174876 A1* | 7/2007 | Maggio .............. | H04L 12/2836 725/78 |

(Continued)

*Primary Examiner* — Ngoc K Vu

(57) ABSTRACT

A system includes a hybrid mobile network/television antenna and a routing device connected to the antenna. The hybrid mobile network/television antenna receives content via a broadcast television network and receives content via a mobile network. The routing device includes a first communication interface that connects to the hybrid mobile network/television antenna, and a second communication interface that connects to a user device and receives a request for content from the user device. The routing device selects a network from the broadcast television network or the mobile network. The first communication interface receives the requested content via the selected network, and the routing device forwards the requested content to the user device via the second communication interface.

20 Claims, 14 Drawing Sheets

(56) References Cited

U.S. PATENT DOCUMENTS

| | | | |
|---|---|---|---|
| 2011/0299411 A1* | 12/2011 | Chen | G06Q 20/10 370/252 |
| 2012/0284756 A1* | 11/2012 | Kotecha | H04L 65/4084 725/68 |
| 2012/0288756 A1* | 11/2012 | Kim | H01M 4/0404 429/208 |
| 2015/0249512 A1* | 9/2015 | Adimatyam | H04H 20/12 725/107 |

* cited by examiner

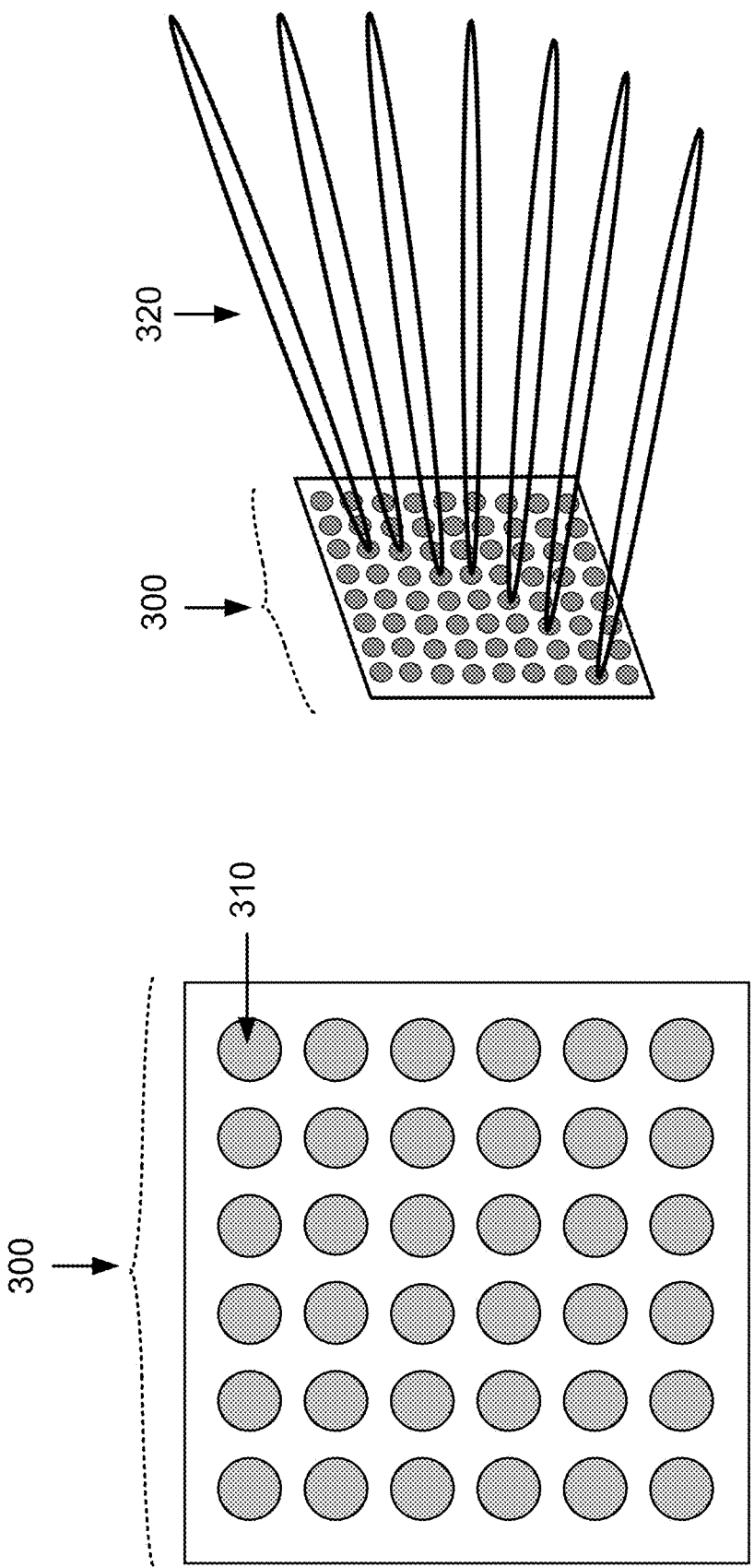

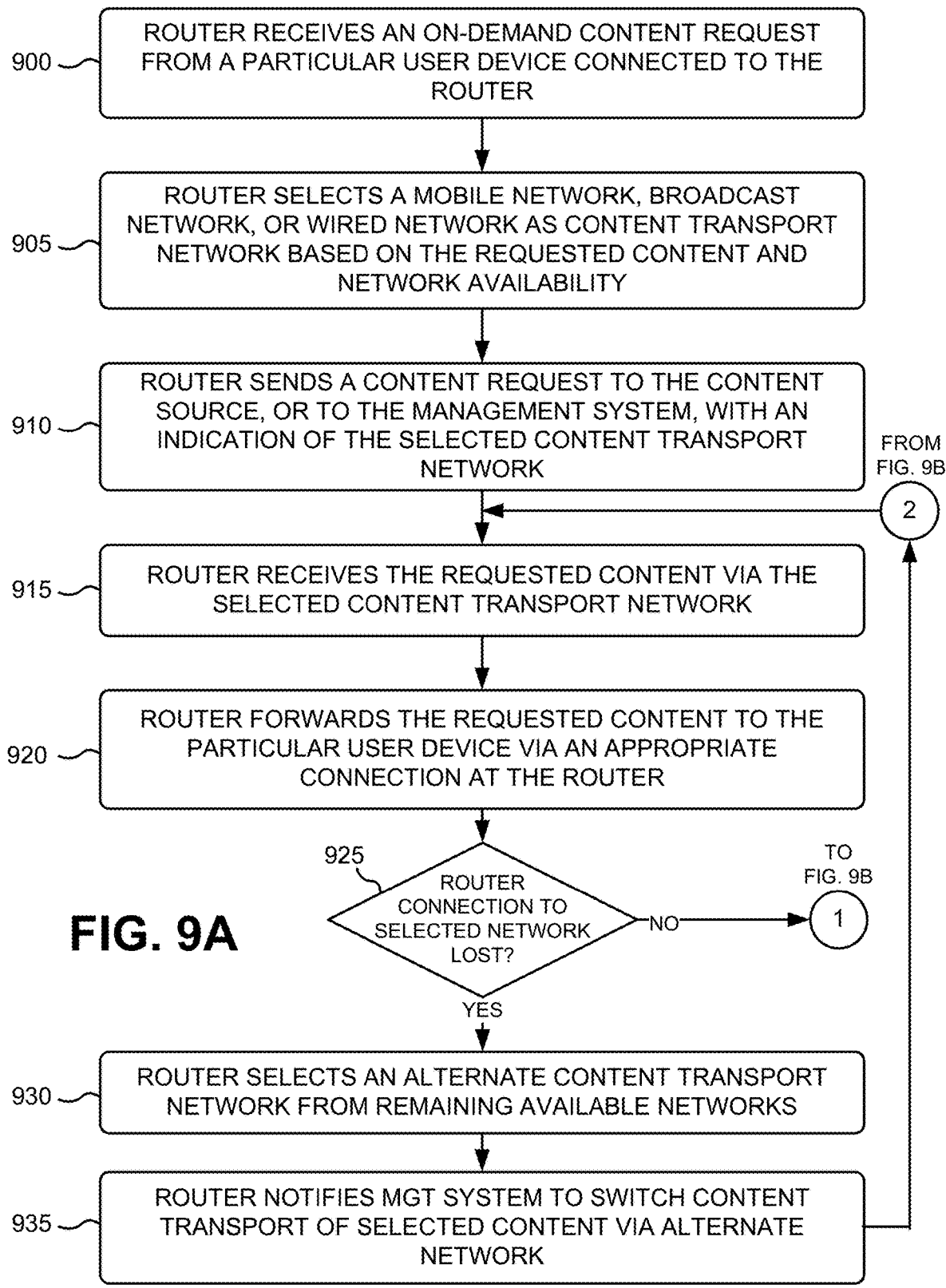

CONTENT DELIVERY VIA HYBRID MOBILE NETWORK/BROADCAST NETWORK INFRASTRUCTURE

BACKGROUND

Next Generation wireless systems are expected to operate in the higher frequency ranges, and the transceivers of such systems are expected to transmit and receive in the Giga-Hertz (GHz) band, alternatively known as the millimeter wave (mmWave) spectrum, and to transmit and receive with a broad bandwidth near 500-1000 MegaHertz (MHz). The expected bandwidth of Next Generation wireless systems is intended to support download speeds of up to about 35-50 Gigabits per second (Gb/s). Next Generation wireless systems, such as 5G systems, are expected to enable a higher capacity than current wireless systems, permitting a greater density of wireless users, with a lower latency.

BRIEF DESCRIPTION OF THE DRAWINGS

FIG. 3A depicts an antenna array that includes a two-dimensional array of antenna elements;

FIG. 3B further depicts examples of beam forming to create antenna beam patterns in three dimensions in the vicinity of the antenna array of FIG. 3A;

FIGS. 9A and 9B are flow diagrams that illustrate an exemplary process for selecting a content transport network, among multiple content transport networks, and for causing, at the router, on-demand content to be switched to the selected content transport network for transportation and for forwarding, by the router, to a destination user device.

DETAILED DESCRIPTION OF THE PREFERRED EMBODIMENTS

The following detailed description refers to the accompanying drawings. The same reference numbers in different drawings may identify the same or similar elements. The following detailed description does not limit the invention, which is defined by the claims.

To satisfy the improved capacity requirements of advanced wireless systems, such as 5G wireless systems, a greatly increased number of antennas, relative to current systems, such as 4G systems, will need to be deployed to support high bandwidth connections to each wireless device. In current wireless systems, such as 4G systems, the typical distance between adjacent antennas is about 5,000-10,000 feet (1-2 miles). In contrast, for proposed next generation wireless systems, such as 5G systems, the distance between adjacent antennas may need to be reduced to about 1,000-1,500 feet. Therefore, next generation wireless systems may need as many as one hundred times the number of antennas as compared to current wireless systems. However, since future networks or 5G use the mmWave spectrum, more antenna elements may be placed within an antenna array to increase throughput. One example of a 5G antenna is a waveguide planar antenna which includes a thin structure having an array of numerous antenna elements for transmitting and receiving radio frequency (RF) signals in the mmWave spectrum.

Exemplary embodiments described herein use a hybrid antenna, which includes a mobile network antenna attached to a general broadcast antenna, such as a television antenna, for selectively receiving content transported over a mobile network or a broadcast network, such as a television network. The hybrid antenna may be an indoor antenna system, or an outdoor antenna system, located at a home residence (or other location) that receives broadcast content (e.g., television content) and which also has an antenna array, capable of operating in the mmWave spectrum, that transmits and receives content over mobile network channels to communicate via a mobile network or with mobile devices in the vicinity of the hybrid antenna system. A router or other network device located at the home residence connects to the hybrid antenna and may selectively request content for transport via the mobile network and the mobile network antenna of the hybrid antenna or via the broadcast network and the broadcast antenna. Selection of a content transport network by the router may, in one implementation, be based on instructions received from a management system that monitors performance parameters and/or demand of the various networks, and which determines an optimized content transport distribution among the various networks. Content transported to the router may be re-routed via an alternate network based on the instructions received from the management system, or based on conditions experienced locally at the router.

Figure 1A:
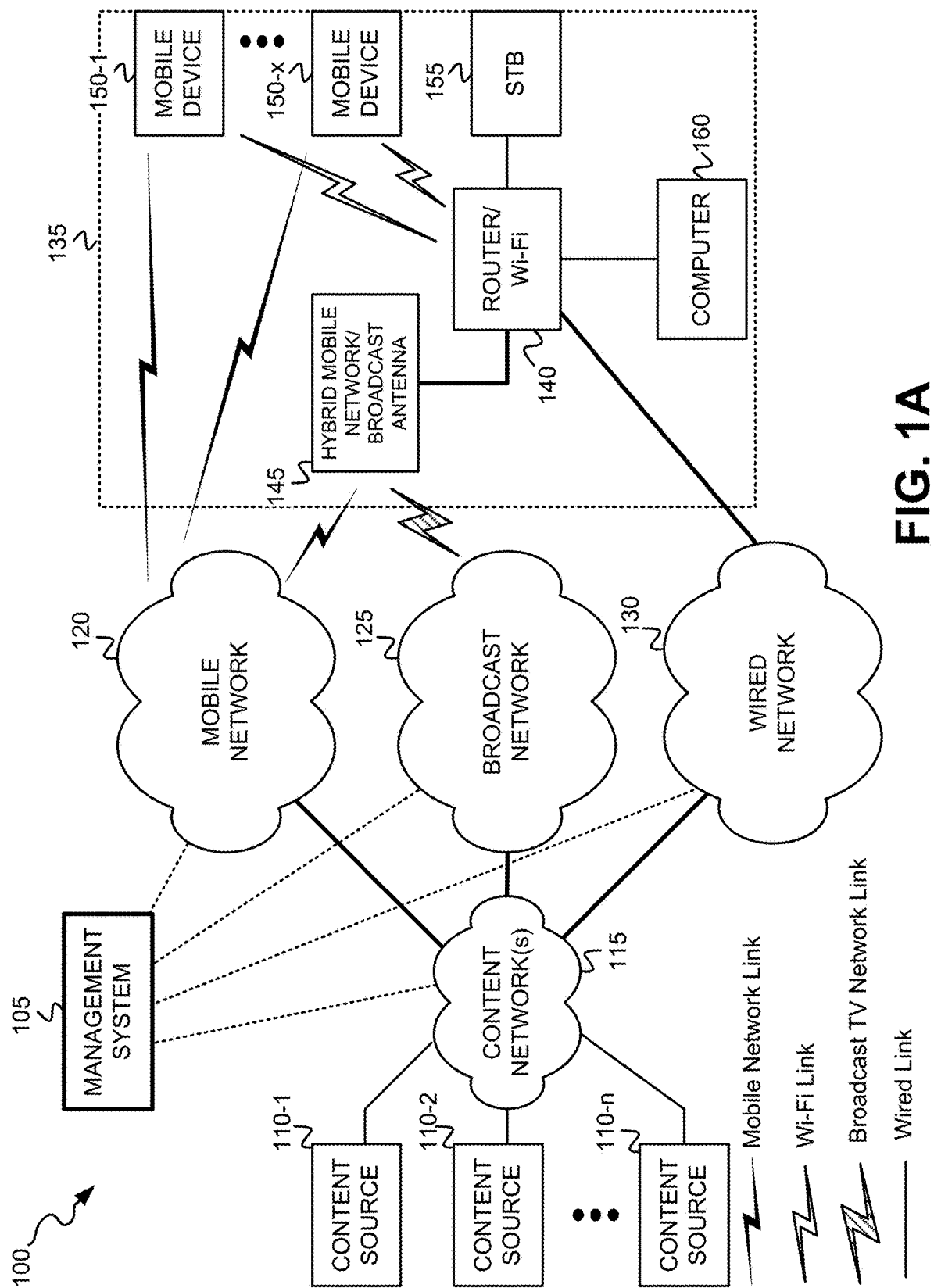
FIG. 1A illustrates an overview of an exemplary network environment in which content may be selectively delivered via a hybrid mobile network/broadcast network infrastructure.

FIG. 1A illustrates an overview of an exemplary network environment 100 in which content may be selectively delivered via a hybrid mobile network/broadcast network infrastructure. As shown, network environment 100 includes a management system 105, multiple content sources 110-1 through 110-*n* (referred to herein as "content source 110" or "content sources 110"), a content network(s) 115, a mobile network 120, a broadcast network 125, a wired network 130, and a network service subscriber location 135. As further shown, network service subscriber location 135 may include a router/Wi-Fi device 140, a hybrid mobile network/TV antenna 145, one or more mobile devices 150-1 through 150-x, a set-top box (STB) 155, and a computer 160. One or more "users" (not shown in FIG. 1A) may be associated with each mobile device 150, STB 155, and computer 160. Each "user" may be an owner, operator, and/or a permanent or temporary user of the mobile device 150, STB 155 and/or computer 160. In the implementation depicted in FIG. 1A, router/Wi-Fi device 140 at network service subscriber location 135 also connects to wired network 130, in addition to having connections to mobile network 120 and broadcast network 125 via hybrid mobile network/broadcast antenna 145.

Management system 105 includes one or more network devices that monitor, and adjust, the distribution of content transported between the various content transport networks (e.g., mobile network 120, broadcast network 125, wired network 130). Based on the monitoring of the content transported over the various content transport networks, management system 105 may change the distribution of the content transported among the content transport networks. For example, if monitoring of the content transport from content sources 110 through mobile network 120 indicates a degradation in network performance (e.g., excessive use of bandwidth, high latency), then management system 105 may cause at least a portion of the content from the content sources 110 to be routed through an alternative network, such as, for example, through broadcast network 125 and/or wired network 130.

Content sources 110 each include one or more network devices that transmit content, via content network(s) 115 and mobile network 120, broadcast network 125, or wired network 130, to a requesting user device, such as, for example, to mobile devices 150, STB 155, and/or computer 160.

Content network(s) 115 includes one or more networks that transport messaging to content sources 110 (e.g., from user devices and/or management system 105), and transport content from content sources 110 to destination user devices, such as mobile devices 150, STB 155, and tablet 160 at network service subscriber location 135. Content network(s) 115 may include, for example, a telecommunications network (e.g., Public Switched Telephone Networks (PSTNs)), a wired and/or wireless local area network (LAN), a wired and/or wireless wide area network (WAN), a metropolitan area network (MAN), an intranet, or the Internet.

Mobile network 120 may include a public land mobile network (PLMN) (e.g., a Code Division Multiple Access (CDMA) 2000 PLMN, a Global System for Mobile Communications (GSM) PLMN, a Long Term Evolution (LTE) PLMN and/or other type of PLMN), or a satellite mobile network.

Broadcast network 125 includes one or more networks that serve to broadcast content via one or more radiofrequency (RF) channels. Broadcast network 125 may, in one implementation, include infrastructure for broadcasting television (TV) content via, for example, Very High Frequency (VHF) or Ultra High Frequency (UHF) RF channels. In one implementation, broadcast network 125 may include an Advanced Television Systems Committee (ATSC) standards-based network (e.g., over the air (OTA) network).

Wired network 130 includes one or more networks that include wired or optical fiber links for broadband transmission of data. In one implementation, wired network 130 may include a cable network that transmits content via, for example, RF and coaxial cables. In another implementation, wired networks 130 may include an optical fiber network that transmits content via optical fibers and optical wavelengths. Each wired network 130 may be owned and operated by a single network service provider. One example of wired network 130 is Verizon's Fiber Optic Service (FiOS®) network that provides fiber-to-the-premises (FTTP) telecommunications service. Wired network 130 may, in some implementations, include one or more channels (modulated or broadcast channels) for delivering content and Electronic Program Guide (EPG) data to STB 155. In other embodiments, network 130 may include any type of network (e.g., cable television network) that delivers content (e.g., television programming) to subscribers via any type of wired or wireless transmission medium. For example, network 130 may include a satellite television network in which content is transmitted wirelessly, via RF signals from one or more satellites, to receiving satellite dishes at each location 135.

Router/Wi-Fi device 140 (herein referred to as "router 140") includes a routing device, residing at a network service subscriber location 135 (e.g., home, office, building, etc.), that routes content to destination user devices, such as mobile devices 150, STB 155, and/or computer 160, and which further routes content requests from user devices to management system 105 and/or to content sources 110. Router 140 may route content received via, for example, mobile network 120, broadcast network 125, or wired network 130. Router 140 may serve as, for example, a "home router" at a home network service subscriber location 135. Router 140 may further include functionality that enables device 140 to establish a wireless local area network (LAN) with wireless user devices (e.g., mobile devices 150) residing at location 135. In one implementation, router 140 establishes the wireless LAN using the IEEE 802.11 standard.

Hybrid mobile network/broadcast antenna 145 includes a broadcast antenna, such as a rooftop or in-house antenna system, that has been modified to additionally include a mobile network antenna array for sending data to, and receiving data from, mobile network 120, and for sending data to, and receiving data from, wireless user devices such as, for example, mobile devices 150. In an exemplary implementation, the broadcast antenna may include one or more antennas, or antenna arrays, for receiving TV content broadcasted over, for example, VHF or UHF RF channels, including TV content broadcasted via an OTA ATSC standards-based network. The mobile network antenna array may, in one implementation, transmit and receive in the mmWave spectrum, such as that proposed for 5G wireless systems. Hybrid mobile network/broadcast antenna 145 corresponds to outdoor antenna system 400 depicted in FIGS. 4A and 4B below, and indoor antenna system 500 depicted in FIG. 5 below. Hybrid mobile network/broadcast antenna 145, therefore, may either be an outdoor system and/or an indoor antenna system residing at location 135. Hybrid mobile network/broadcast antenna 145, as shown in FIG. 1A, may connect to router 140 via a wired or wireless connection (e.g., wired or wireless LAN connection), or may be integrated with router 140.

Mobile devices 150 each includes any type of computational device having one or more wireless communication interfaces for communicating via mobile network 120, hybrid mobile network/broadcast antenna 145, a wireless personal area network (PAN) (e.g., BLUETOOTH) established by router 140, or a wireless LAN (e.g., Wi-Fi) established by router 140. Mobile devices 150 may each include, for example, a cellular radiotelephone; a smart phone; a personal digital assistant (PDA); a wearable computer; a desktop, laptop, palmtop or tablet computer; or a media player. Mobile devices 150 may each include a mmWave communication interface, a Wi-Fi communication interface, and/or a wireless PAN communication interface (e.g., BLUETOOTH).

STB 155 includes a device that enables a TV to receive and decode TV broadcasts, and to serve as a user interface to the Internet. STB 155 may, for example, receive content from content source(s) 110 via one or more channels (e.g., Quadrature Amplitude Module (QAM) channels, Internet Protocol (IP) streams, etc.) over wired network 130. The content may include, for example, text, images, audio, video content and/or television (TV) video programs. Network 130 may, in some implementations, include one or more QAM channels (or other types of modulated or broadcast channels) for delivering content and Electronic Program Guide (EPG) data to STB 155.

Computer 160 may include a desktop or laptop computer having a wired connection to router/Wi-Fi device 140. Computer 160 may, for example, connect to a wired LAN connection to router 140 at the network service subscriber location 135.

The configuration of the components/devices of network environment 100 depicted in FIG. 1A is for illustrative purposes only, and other configurations may be implemented. Therefore, network environment 100 may include additional, fewer and/or different components, that may be configured differently, than depicted in FIG. 1A. For example, though a single network service subscriber location 135 is shown in FIG. 1A, network environment 100 may include numerous different network service locations 135, with each location 135 having its own router 140, hybrid mobile network/broadcast antenna 145, mobile devices 150, STB 155, and/or computer 160. Additionally, though a single computer 160 is depicted as residing at network service subscriber location 135, multiple different computers 160 may connect to router 140 at location 135 via wired connections.

Figure 1B:
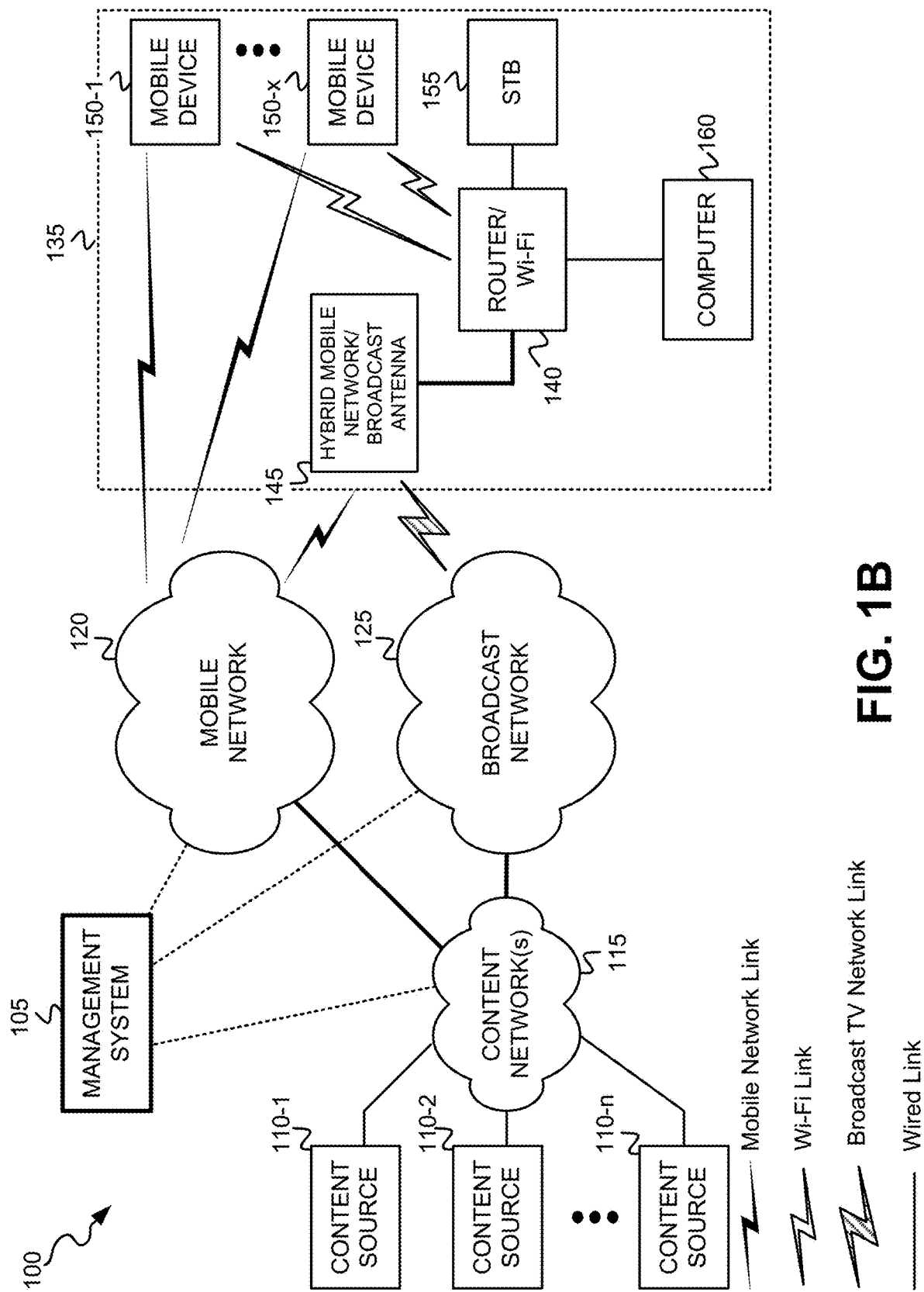
FIG. 1B illustrates an exemplary implementation of the network environment depicted in FIG. 1A in which the network service subscriber location does not include a connection to the wired network.

FIG. 1B illustrates an exemplary implementation of the network environment 100 in which network service subscriber location 135 does not include a connection to wired network 130 or other wired or optical broadband connection. In this implementation, the users at location 135 have not subscribed to the particular network service offered by the network service provider administering wired network 130. For example, the user or owner of the residence/business at location 135 does not subscribe to FiOS® by Verizon (or other cable network provider) and, therefore, only has network connections via mobile network 120 and/or broadcast network 125 (or via other networks (not shown) other than wired network 130). In the implementation depicted in FIG. 1B, management system 105 may control the distribution of content transport among mobile network 120 and broadcast network 125, and not wired network 130.

Figure 1C:
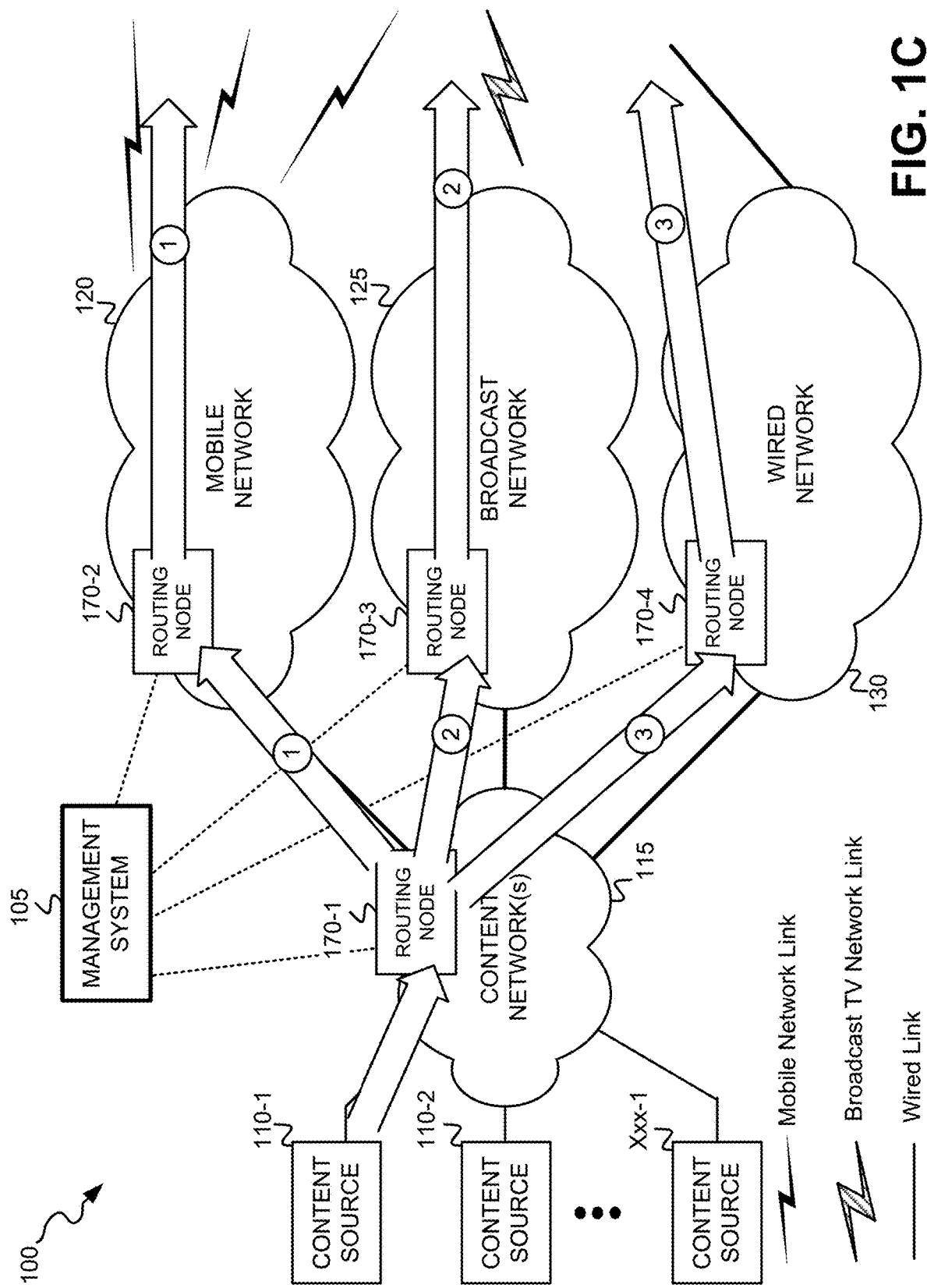
FIG. 1C depicts an example of control of the routing of content transported from content sources to destination user devices via the mobile network, the broadcast network, and/or the wired network of FIG. 1A.

FIG. 1C depicts an example of control of the routing of content transported from content sources 110 to destination user devices via mobile network 120, broadcast network 125 and/or wired network 130. As shown, at least one routing node may reside in each network, such as routing node 170-1 in content network(s) 115, routing node 170-2 in mobile network 120, routing node 170-3 in broadcast network 125, and routing node 170-4 in wired network 130. Management system 105 may send control messaging to routing nodes 170-1, 170-2, 170-3 and/or 170-4 to cause the routing nodes 170 to route content transported from content sources 110 to destination devices via either of mobile network 120, broadcast network 125 and/or wired network 130. For example, management system 105 may, based on monitoring of performance parameters (e.g., bandwidth usage, latency) of mobile network 120, broadcast network 125 and/or wired network 130, optimize the distribution pattern of content transport among networks 120, 125 and/or 130. Additionally, management system 105 may control the routing of content from a content source 110 to a destination device based on device connection information received from the destination device, or from the router 140 to which the destination device is locally connected. For example, if a Wi-Fi connection between a router 140 and a mobile device 150 is lost, then router 140 may notify management system 105, which may send control messaging to re-route the content transport via wired network 130 to transport via mobile network 120.

In the example depicted in FIG. 1C, management system 105 sends control messaging to cause routing node 170-1 to route content from content source 110-1 either via mobile network 120, broadcast network 125, or wired network 130. As shown, management system 105 may send control messaging to cause routing node 170-1 to route content from content source 110-1 to routing node 170-2 in mobile network 120 (shown with a "1" within a circle), which in turn routes the content through mobile network 120 to a particular destination device (not shown). Alternatively, management system 105 may send control messaging to cause routing node 170-1 to route content from content source 110-1 to routing node 170-3 in broadcast network 125 (shown with a "2" within a circle), which in turn routes the content through broadcast network 125 to a particular destination device (not shown). As a further alternative, management system 105 may send control messaging to cause routing node 170-1 to route content from content source 110-1 to routing node 170-3 in wired network 130 (shown with a "3" within a circle), which in turn routes the content through wired network 130 to a particular destination device (not shown).

Figure 2:
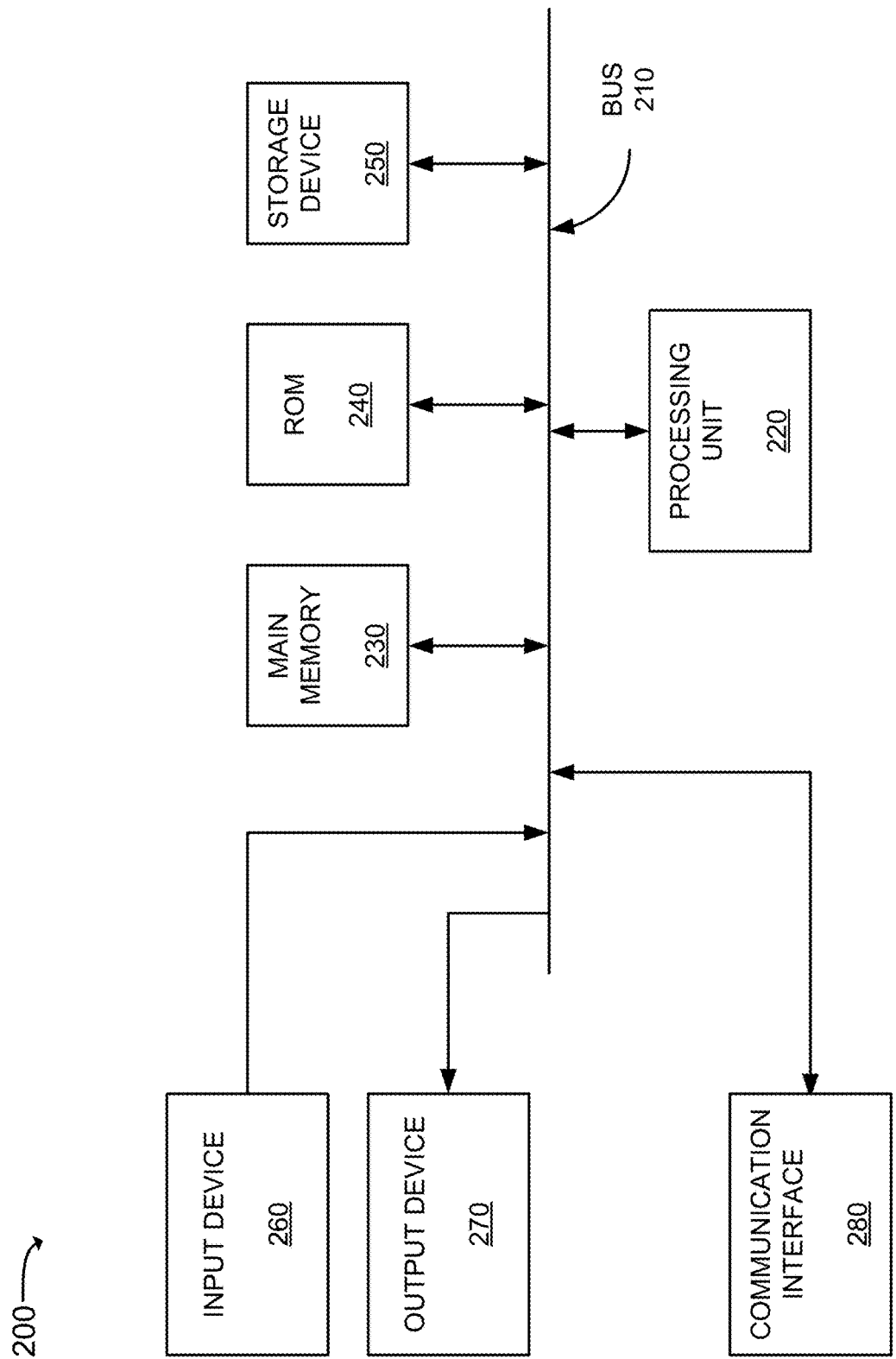
FIG. 2 is a diagram that depicts exemplary components of a device that may correspond to the management system, hybrid antenna, router, mobile device, set-top box and/or computer of FIG. 1A.

FIG. 2 is a diagram that depicts exemplary components of a device 200. Management system 105, content sources 110, routing nodes 170, router 140, hybrid mobile network/broadcast antenna 145, mobile device 150, STB 155, and computer 160 may each include the same, or similar, components to those of device 200 shown in FIG. 2. Device 200 may include a bus 210, a processing unit 220, a main memory 230, a read only memory (ROM) 240, a storage device 250, an input device 260, an output device 270, and a communication interface 280.

Bus 210 includes a path that permits communication among the components of device 200. Processing unit 220 may include one or more processors or microprocessors, or processing logic, which may interpret and execute instructions. Main memory 230 may include a random access memory (RAM) or another type of dynamic storage device that may store information and instructions for execution by processing unit 220. ROM 240 may include a ROM device or another type of static storage device that stores static information and instructions for use by processing unit 220. Storage device 250 may include a magnetic and/or optical recording medium. Main memory 230, ROM 240 and storage device 250 may be a "tangible and/or non-transitory computer-readable medium."

Input device 260 may include one or more devices that permit a user to input information to device 200, such as, for example, a keypad or a keyboard, a display with a touch sensitive panel, voice recognition and/or biometric mechanisms, etc. Output device 270 may include one or more devices that output information to the user, including a display (e.g., with a touch sensitive panel), a speaker, etc. Input device 260 and output device 270 may be implemented as a graphical user interface (GUI) (e.g., a touch screen GUI that uses any type of touch screen device) that displays GUI information and which receives user input via the GUI. Communication interface 280 may include one or more transceivers that enable device 200 to communicate with other devices and/or systems. For example, in the case where device 200 is management system 105, communication interface 280 may include one or more wired and/or wireless transceivers for communicating via content network(s) 115, mobile network 120, broadcast network 125 and/or wired network 130. In the case where device 200 is router 140, communication interface 280 may include a communication interface(s) for establishing a wired LAN that permits communication with antenna 145, STB 155, and computer 160, and a second communication interface(s) for establishing a wireless LAN (e.g., Wi-Fi) that permits wireless communication with mobile devices 150. In yet another case where device 200 is antenna 145, communication interface 280 may include a first transceiver that includes circuitry for communicating with mobile network 120 or mobile devices 150 over a mobile network channel(s), and a second transceiver that includes circuitry for receiving broadcast content via broadcast network 125.

The configuration of components of device 200 shown in FIG. 2 is for illustrative purposes. Other configurations may be implemented. Therefore, device 200 may include additional, fewer and/or different components, arranged in a different configuration, than depicted in FIG. 2.

FIG. 3A depicts an antenna array 300 that includes an array of antenna elements 310. In one implementation, the array of antenna elements 310 of array 300 may include multiple waveguide planar antennas that each transmit and receive within the mmWave spectrum, such as that to be used in a 5G wireless system. In the example of FIG. 3A, the array of antenna elements 310 are arranged two-dimensionally within a square, with the antenna elements 310 configured in horizontal rows and vertical columns. The array of antenna elements 310 for a particular antenna may, however, be arranged in other two-dimensional configurations, or even in a three-dimensional configuration. Antenna array 300 may be a component of hybrid mobile network/broadcast antenna 145.

FIG. 3B further depicts examples of beam forming to create antenna beam patterns in three dimensions in the vicinity of antenna array 300. The example of FIG. 3B depicts multiple antenna beam patterns 320 formed horizontally and vertically by each antenna element 310 in array 300. Thus, as shown in FIG. 3B, each antenna element 310 may be configured to generate a particular antenna beam pattern 320 that extends outwards at a particular angle relative to the vertical plane of the antenna array 300 such that antenna array 300 covers a three dimensional space in the vicinity of array 300. As shown in FIG. 3B, each antenna element 310 may be configured to generate a respective antenna beam pattern 320 at a different angle (i.e., different elevation, different azimuth) relative to the position of each antenna's respective row and column within the antenna array 300.

Figure 4A:
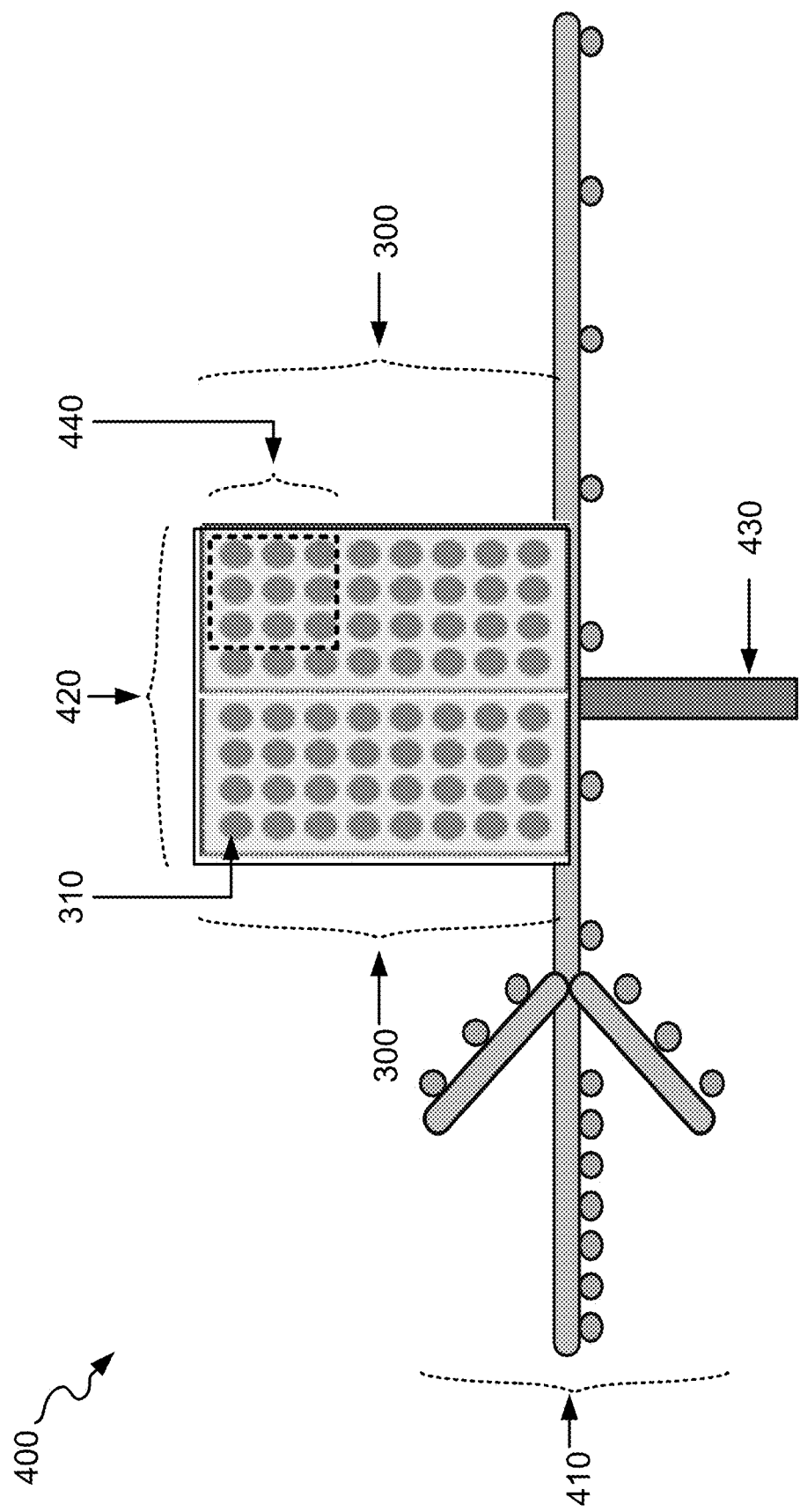
FIGS. 4A and 4B depict an outdoor antenna system that includes a broadcast antenna and a mobile network antenna array.
Figure 4B:
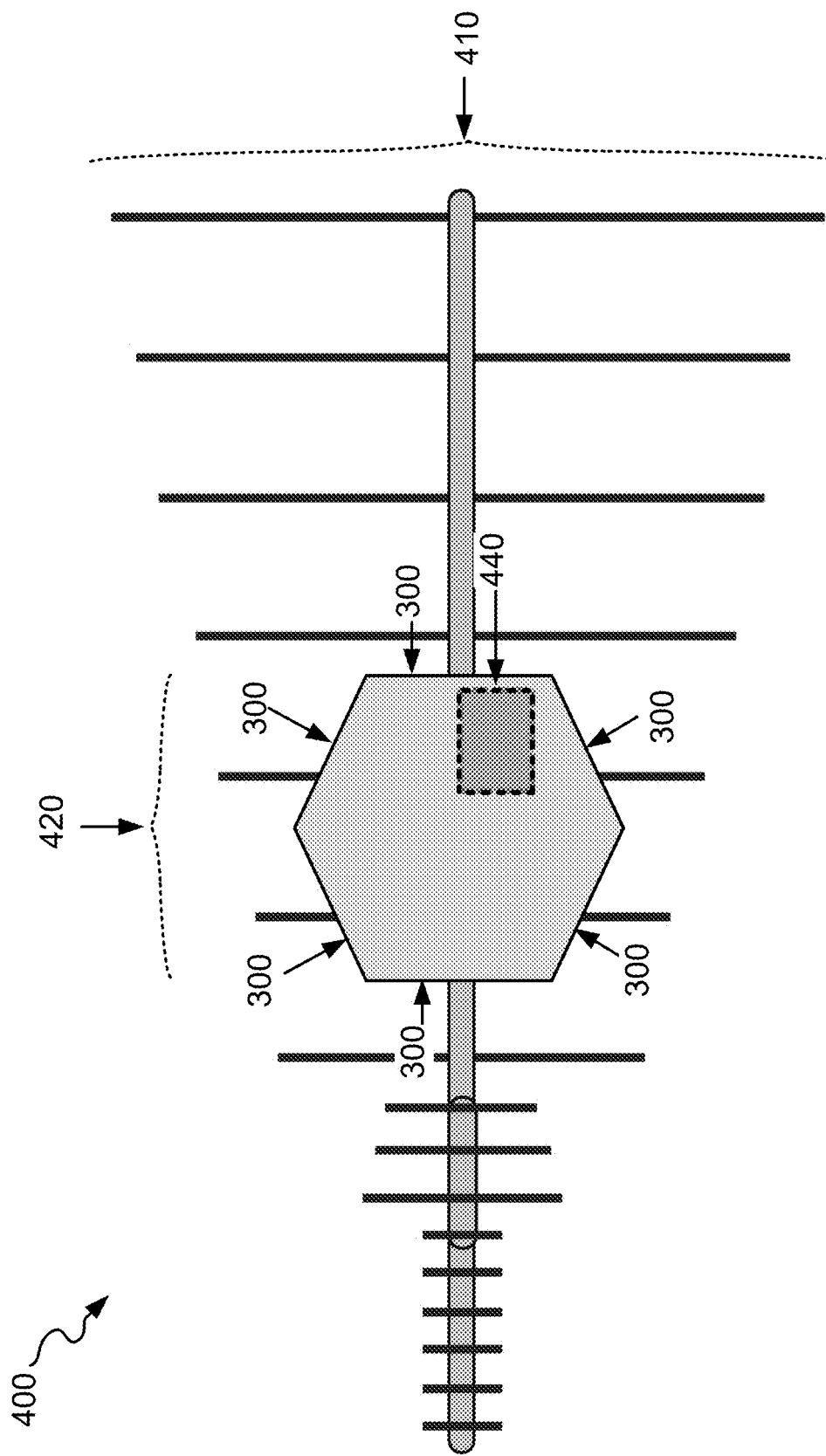

FIGS. 4A and 4B depict an outdoor antenna system 400 that includes a broadcast antenna 410 and a mobile network antenna array 420. Broadcast antenna 410 may include, as shown, multiple conductive elements, where a length of each conductive element may correspond to a certain broadcast frequency (e.g., VHF or UHF frequency). In one implementation, broadcast antenna 410 may include a broadcast TV antenna. Mobile network antenna array 420 may include one or more arrays of antennas, such as multiple versions of the antenna array 300 depicted in FIGS. 3A and 3B. As shown in FIG. 4A, broadcast antenna 410 and mobile network antenna array 420 may be formed as a unitary unit or may be attached together to form a single unit, and further attach to a supporting pole 430 (or other type of supporting structure). The supporting pole 430, in turn, attaches to a roof of a building (e.g., a house), or attaches directly to the ground.

FIG. 4B depicts an exemplary configuration of antenna array 420 in which six antenna arrays 300 are arranged in a hexagonal structure with each antenna array 300 being directed outwards from the center of the hexagonal structure. As depicted in FIGS. 4A and 4B, transceiver electronics 440, for transmitting and receiving via the antenna elements 310 of the antenna arrays 300, may be disposed on, or within, the hexagonal structure of antenna array 420. The transceiver electronics 440 may include, for example, electronic circuitry associated with transmission and receipt within 5G wireless systems. The configuration of antenna array 420 depicted in FIG. 4B permits directional reception from mobile network 120 and/or user devices (e.g., mobile devices 150), and directional transmission to mobile network 120 and/or user devices (e.g., mobile devices 150). The exemplary antenna array 420 of FIGS. 4A and 4B may be placed at particular locations such as, for example, network service subscriber locations 135 (e.g., home residences). The configuration of antenna array 420 shown in FIGS. 4A and 4B is one example of an antenna system 400 that includes a broadcast antenna 410 and an antenna array 420. Other configurations, including other physical arrangements of antenna array 420 and other types of broadcast antennas, may be alternatively used for antenna system 400.

Figure 5:
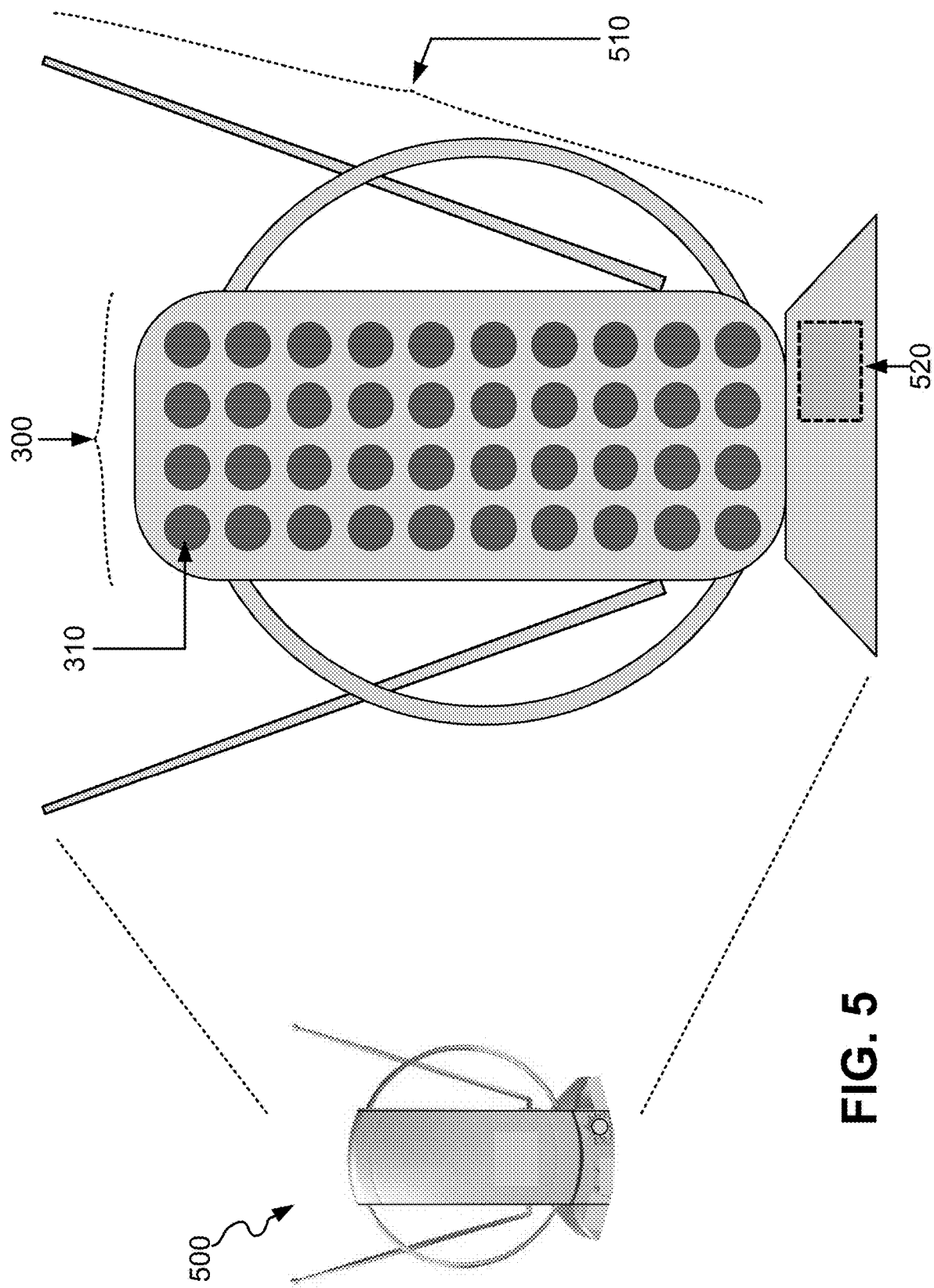
FIG. 5 depicts an exemplary indoor antenna system that includes broadcast antennas and a mobile network antenna array.

FIG. 5 depicts an exemplary indoor antenna system 500 that includes broadcast antennas 510 and a mobile network antenna array 300. In one implementation, broadcast antennas 510 may include broadcast TV antennas. As shown, broadcast antennas 510 may include dipole antennas (e.g., for VHF) and loop antennas (e.g., for UHF). A single antenna array 300 is depicted as being disposed within indoor antenna system 500. However, multiple antenna arrays 300 may be disposed within indoor antenna system 500 to provide for directionality in transmission and reception. In the example depicted in FIG. 5, indoor antenna system 500 includes a cabinet in which is disposed transceiver electronic circuitry 520 for transmitting to, and receiving from, mobile network 120 via antenna array 300. Transceiver electronics 520 may additionally, transmit to, and receive from, wireless user devices (e.g., mobile devices 150) at the location 135 at which antenna system 500 resides. Indoor antenna system 500 may, thus, effectively serve as a home location "base station" for relaying transmissions to, and from, mobile devices 150. Indoor antenna system 500 may connect, via, for example, a wired connection (e.g., a LAN connection) to router 140 at location 135 such that router 140 may route data transmissions to/from mobile network 120 and/or mobile devices 150.

Figure 6:
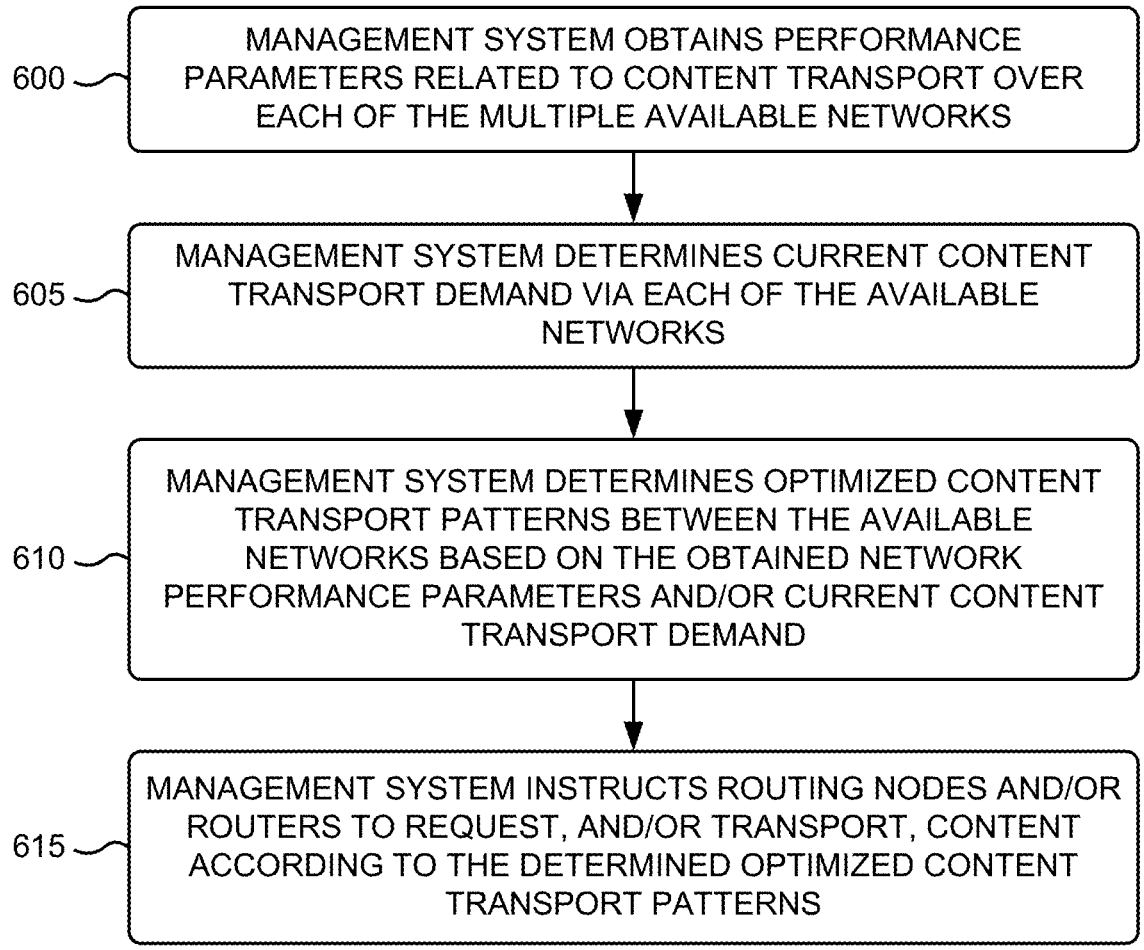
FIG. 6 is a flow diagram that illustrates an exemplary process for optimizing content transport patterns to and from a network service subscriber location via multiple different available transport networks, such as via the mobile network, the broadcast network and/or the wired network of FIG. 1A.

FIG. 6 is a flow diagram that illustrates an exemplary process for optimizing content transport patterns to and from network service subscriber location 135 via multiple different available transport networks, such as via mobile network 120, broadcast network 125 and/or wired network 130 of FIG. 1A. The exemplary process of FIG. 6 may be implemented by management system 105, in conjunction with routing nodes 170 and/or router 140.

The exemplary process includes management system 105 obtaining performance parameters related to content transport over each of the multiple available networks (block 600). Management system 105 may obtain network performance data from various different nodes within each of content network(s) 115, mobile network 120, broadcast network 125, and/or wired network 130. Additionally, management system 105 may obtain network performance data from router 140, including, for example, the reliability, quality, and bandwidth of the connection from wired network 130 to router 140, and/or from mobile network 120 and broadcast network 125 to hybrid mobile network/broadcast antenna 145 and router 140. Management system 105 may, thus, obtain network performance data (e.g., overall network outages, network region outages, network bandwidth limitations) or specific network link performance data, such as, for example, the performance of specific connections between mobile network 120 and mobile devices 150 and/or hybrid mobile network/broadcast antenna 145

Management system 105 determines current content transport demand via each of the available networks (block 605). Management system 105 may obtain data regarding current transport demand from various different nodes within each of content network(s) 115, mobile network 120, broadcast network 125, and/or wired network 130. The current transport demand may include transport demand as related to the level of bandwidth utilization globally, or within particular regions of each of networks 120, 125, and/or 130.

Management system 105 determines optimized content transport patterns between the available networks based on the obtained network performance parameters and/or current content transport demand (block 610). For example, management system 105 may take into account current bandwidth constraints and/or current transport demand within each of networks 120, 125, and 130 to determine optimized content transport patterns across networks 120, 125 and 130. Various different transport pattern optimization algorithms may be used for optimizing content transport across the networks 120, 125, and 130 to destination user devices. The various different optimization algorithms may use various different measures of network performance and/or different measures related to transport demand. One example of a transport pattern optimization algorithm may attempt to balance bandwidth usage of the content transport among networks 120, 125 and 130. Another example of a transport pattern optimization algorithm may attempt to minimize content transport costs when transporting content among networks 120, 125 and 130. For example, content transport via mobile network 120 may be considered the most costly alternative, so the transport optimization algorithm may direct content transport via broadcast network 125 and/or wired network 130 when such networks have sufficient bandwidth available.

Management system 105 instructs routing nodes 170 and/or routers 140 to request, and/or transport, content according to the determined optimized content transport pattern(s) (block 615). For each router 140 and routing node 170, management system 105 may generate a message that includes instructions related to the optimized content transport from content sources 110, via networks 120, 125, and 130, to router 140 and/or mobile devices 150. As an example, management system 105 may instruct router 140 to request live TV content based on rules that establish a precedence: 1) via broadcast network 125 if available, 2) via wired network 130 if available, or 3) via mobile network 120 and antenna 145 if available. As another example, management system 105 may instruct router 140 to currently request all live TV content via wired network 130, if available, otherwise, via mobile network 120.

Figure 7A:
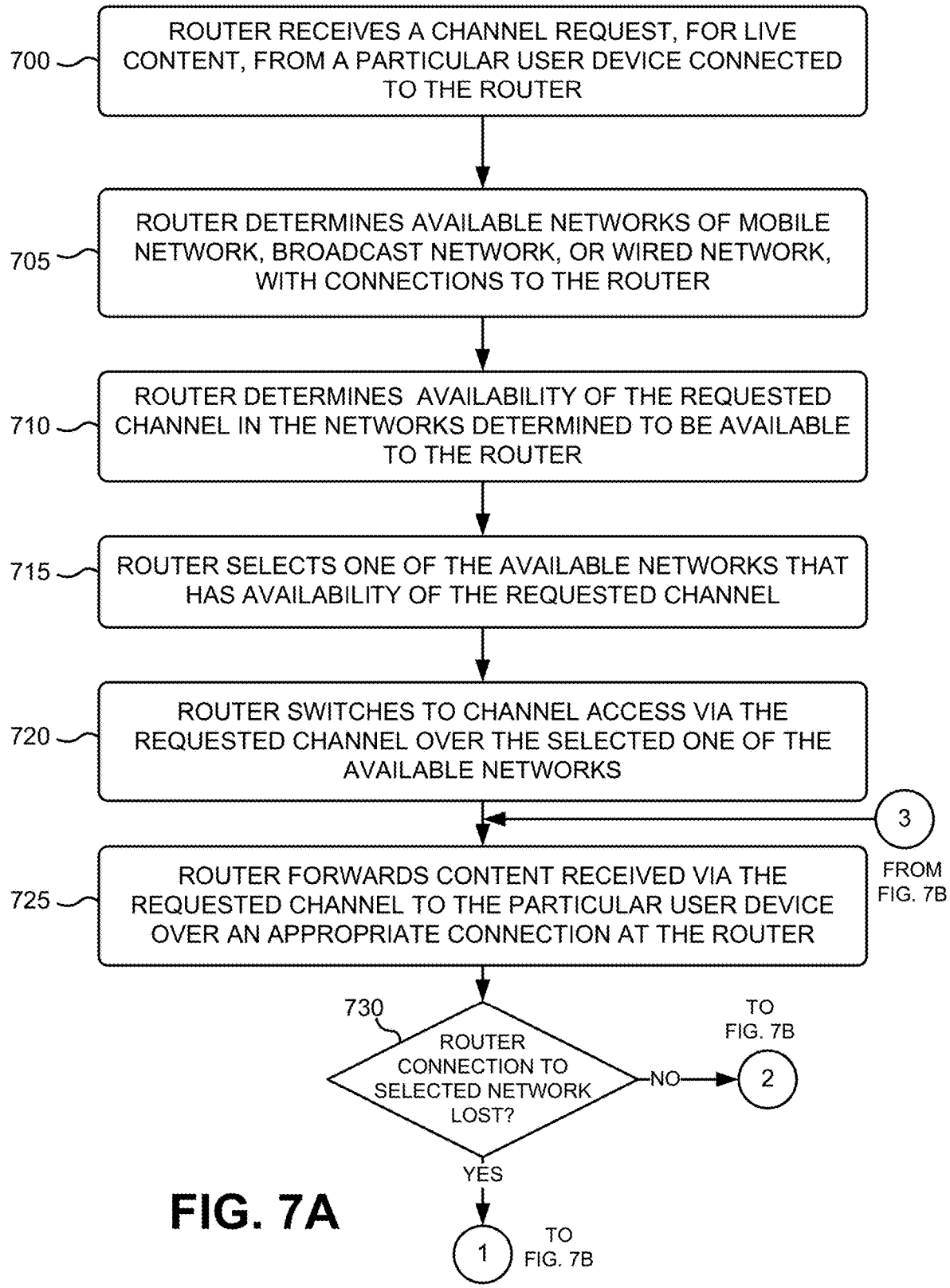
FIGS. 7A and 7B are flow diagrams that illustrate an exemplary process for selecting a content transport network, among multiple content transport networks, and for causing live content to be accessed via a selected content transport network for forwarding, by the router, to a destination user device.
Figure 7B:
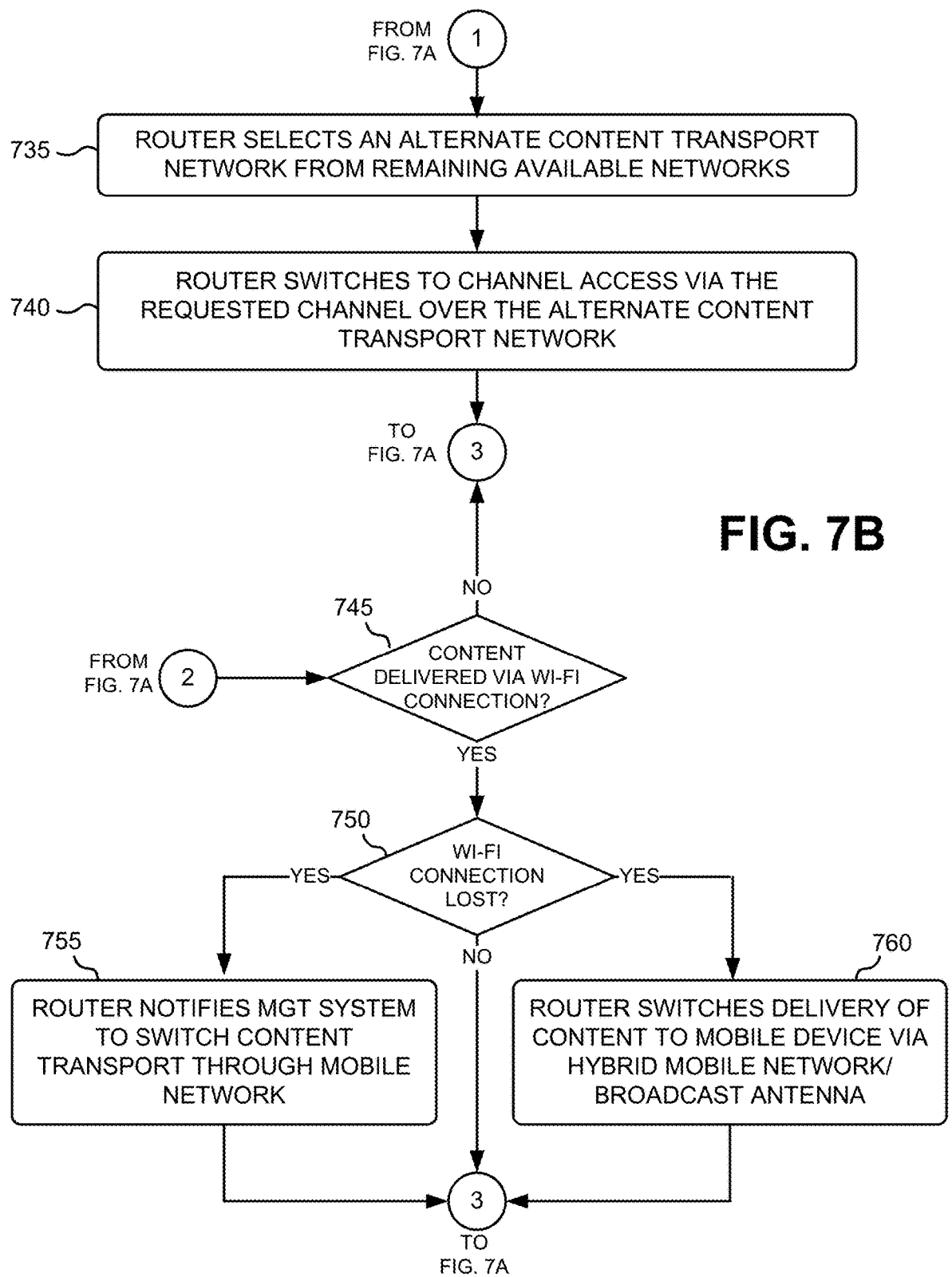

FIGS. 7A and 7B are flow diagrams that illustrate an exemplary process for selecting a content transport network, among multiple content transport networks, and for causing live content (e.g., live TV RF broadcasts, or live wired or wireless streaming) to be accessed via a selected content transport network for forwarding, by router 140, to a destination user device (e.g., mobile device 150, STB 155, computer 160). The exemplary process of FIGS. 7A and 7B may be implemented by router 140. "Live content," as referred to herein, includes content that is in the process of being broadcasted (e.g., over broadcast network 125) for receipt at multiple user devices (e.g., TV content currently being broadcasted via a TV network), or includes content that is being streamed in a multicast fashion and which any user device may elect to receive as an on-going content stream.

The exemplary process includes router 140 receiving a channel request, for live content, from a particular user device connected to the router 140 (block 700). A user device connected to router 140, such as a mobile device 150, STB 155, or a computer 160, may send a channel request for receiving a live TV VHF/UHF broadcast or live streaming content. In the case of a live TV VHF/UHF broadcast, the channel request may identify the particular UHF or VHF channel over which the particular content is being broadcast. In the case of live streaming content, the channel request may include, for example, a Uniform Resource Locator (URL) associated with a network device (e.g., a server) from which the content may be streamed using a streaming media protocol. Router 140 may receive the channel request via a wireless LAN connection from a mobile device 150, via a wired connection from STB 155, or via a wired connection from computer 160.

Router 140 determines available networks of mobile network 120, broadcast network 125 and/or wired network 130, with connections to router 140 (block 705). If hybrid mobile network/broadcast antenna 145 is connected to router 140, then mobile network 120 and broadcast network 125 may be available to router 140. Additionally, if optical fiber network has a connection to router 140, then wired network 130 may be available to router 140. Availability of a particular one of networks 120, 125, and 130 may also be based on whether service of each of the networks is currently available (i.e., no network outages), or based on the current available bandwidth of the connection between each of the networks 120, 125 and 130 and router 140. For example, if congestion exists on the wireless interface between mobile network 120 and router 140 (via antenna 145), then mobile network 120 may be considered as currently unavailable until the congestion is alleviated. As another example, if a network outage exists on wired network 130, then wired network 130 may be considered as currently unavailable until the network outage is resolved.

Router 140 determines the availability of the requested channel in the networks determined to be available to the router 140 (block 710). Certain content channels may only be available over certain of networks 120, 125 and/or 130. For example, the History Channel may only be available via wired network 130 or mobile network 120, and may not be available via broadcast network 125. As another example, a boxing sporting event streamed via a live content streaming channel may only be available via mobile network 120 and/or wired network 130. As a further example, a broadcast TV channel (e.g., CBS) may only be available via broadcast network 125 and/or wired network 130.

Router 140 selects one of the available networks that have availability of the requested channel (block 715). Router 140 selects a network based on the available networks determined in block 705, and the availability of the requested channel in the available networks determined in block 710. If the requested channel is available via more than one available network, then router 140 may apply a selection algorithm to determine with network to select. The selection algorithm may take into account current network performance parameters (e.g., bandwidth of each network's connection to router 140), or other factors. Router 140 may additionally receive a message from management system 105 that instructs router 140 to request content according to an optimized transport pattern determined by management system 105 (e.g., in block 615 of FIG. 6). In one implementation, the instructions from management system 105 may explicitly identify which network to currently use for certain types of content. In this implementation, the instructions from management system 105 take priority over any network selection performed by router 140 in block 715. In another implementation, the instructions from management system 105 may include a set of rules that router 140 should apply for determining which of networks 120, 125 or 130 to select for transport of the requested channel. The set of rules may take precedence over any network selection performed by router 140 in block 715, or may be used in conjunction with any network selected performed by router 140 in block 715.

Router 140 switches to channel access via the requested channel over the selected one of the available networks (block 720). If the requested channel is to be accessed via broadcast network 125, for example, router 140 causes hybrid mobile network/broadcast antenna 145 to tune to the appropriate UHF or VHF channel to receive the live broadcast TV content. Antenna 145, including its associated transceiver circuitry, converts the broadcast TV content into digital content that can be sent to router 140 for forwarding to the particular user device that requested the live broadcast TV content. If the requested channel is to be accessed via mobile network 120, for example, router 140 causes hybrid mobile network/broadcast antenna 145 to "listen" to the appropriate wireless mobile network channels transmitted from mobile network 120 to receive the content from the requested channel. Router 140 may, prior to "listening" to mobile network 120, send a content request to content source 110 and/or management system 105 to request the content be transported via mobile network 120 to the requesting user device.

Router 140 forwards content received via the requested channel to the particular user device over an appropriate connection at router 140 (block 725). If a mobile device 150 has requested the content, then router 140 may forward the content to mobile device 150 via a wireless LAN connection (e.g., Wi-Fi connection). If STB 155 has requested the content, then router 140 may forward the content to STB 155 via, for example, a wired LAN connection between router 140 and STB 155. If computer 160 has requested the content, then router 140 may forward the content to computer 160 via, for example, another wired LAN connection between router 140 and computer 160.

Router 140 determines if a connection to the selected network has been lost (block 730). For example, if the selected network is mobile network 120, then the connection between mobile network 120 and router 140 may be lost (e.g., due to inadequate signal strength), or may be dropped.

As another example, if the selected network is broadcast network 125, then insufficient signal strength, or signal interference, may result in a loss of broadcast signal (e.g., broadcast TV signal), representing a loss of connection. As a further example, if the selected network is wired network 130, then a network outage at wired network 130 may result in a loss of connection with router 140. If the connection to the selected network has been lost (YES—block 730), then router 140 selects an alternate content transport network from the remaining available networks (block 735), and switches to channel access via the requested channel over the alternate content transport network (block 740). For example, if the selected network was broadcast network 125, and the connection to antenna 145 and router 140 was lost, then router 140 may select an alternate network from either mobile network 120 or wired network 130. In an implementation in which wired network 130 is not connected to router 140, then router 140 may select mobile network 120 for continuing the transport of the content to the requesting user device.

If the connection to the selected network has not been lost (NO—block 730), then router 140 determines if the content is being delivered via a Wi-Fi connection at router 140 (block 745). The content requesting user device may be mobile device 150, and mobile device 150 may have been receiving the content via a wireless LAN connection (e.g., Wi-Fi connection) from router 140 to mobile device 150. For example, the requested content may be transported via broadcast network 125 to antenna 145 and router 140, and then forwarded from router 140 to mobile device 150 via the Wi-Fi connection between router 140 and mobile device 150. As another example, the requested content may be transported via mobile network 120 to antenna 145 and router 140, and then forwarded from router 140 to mobile device 150 via the Wi-Fi connection between router 140 and mobile device 150. If the content is not being delivered from router 140 via a Wi-Fi connection (NO—block 745), then the exemplary process may return to block 725 with the continued forwarding of content via the requested channel to the particular user device.

If content is being delivered via a Wi-Fi connection at router 140 (YES—block 745), then router 140 determines if the Wi-Fi connection has been lost (block 750). The wireless LAN connection to the user device may be lost due to, for example, signal strength issues (e.g., mobile device 150 is moved too far from router 140), failure of the wireless LAN transceiver at mobile device 150, etc. In a first implementation, if the Wi-Fi connection has been lost to the user device at router 140 (left-side "YES"—block 750), then router 140 notifies management system 105 to switch content transport through mobile network 120 (block 755). Referring to FIG. 1C, upon receipt of the notification from router 140, management system 105 may instruct routing node 170-1 and routing node 170-2 to switch the content transport from content network(s) 115 to mobile network 120, and directly to the mobile device 150. In a second implementation, if the Wi-Fi connection has been lost to the user device at router 140 (right-side "YES"—block 750), then router 140 switches delivery of the content to the user device (e.g., mobile device 150) via hybrid mobile network/broadcast antenna 145 (block 760).

Figure 8:
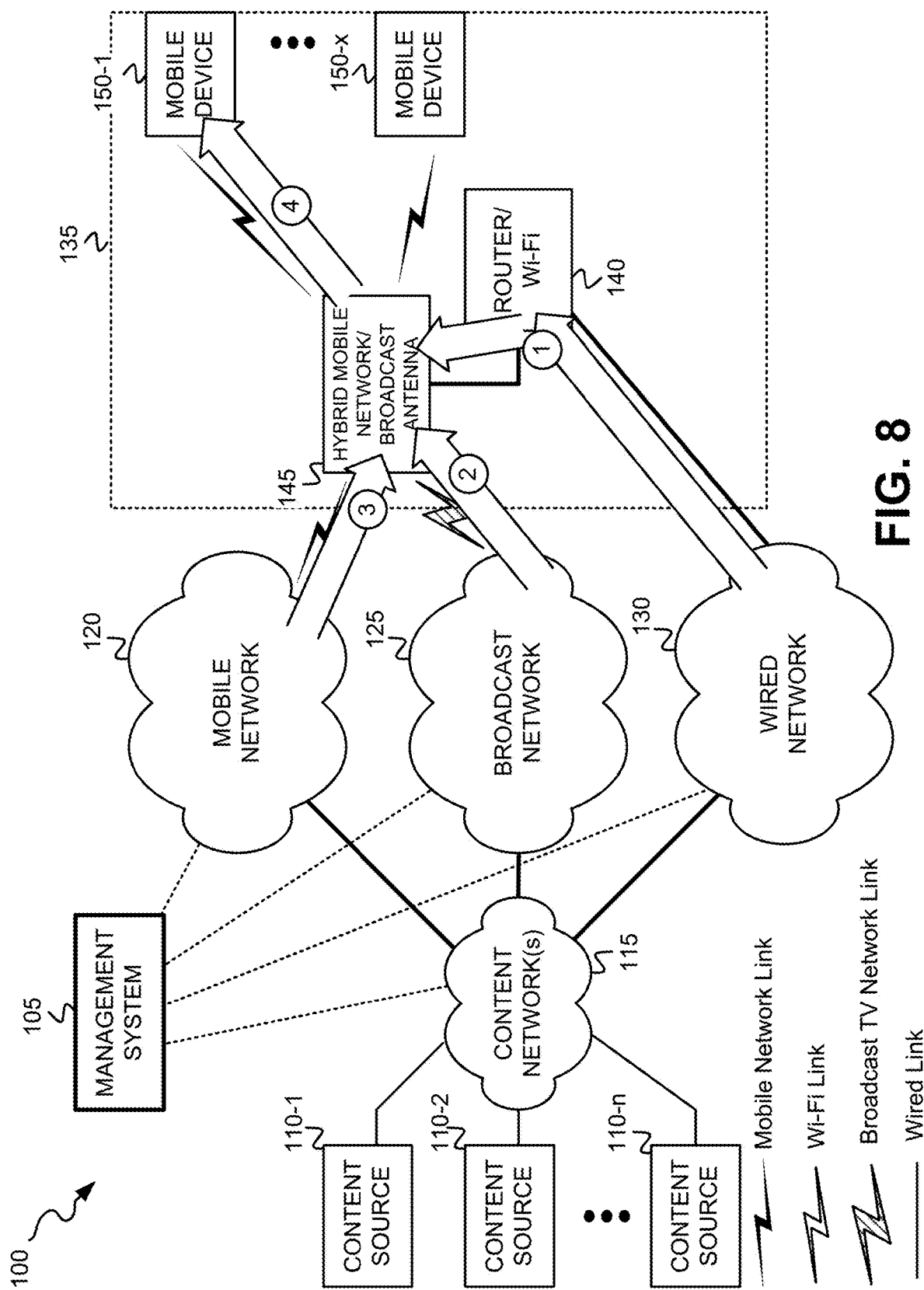
FIG. 8 depicts an example of the routing of content from the router to a destination user device via a mobile network connection and the hybrid mobile network/broadcast antenna of FIG. 1A.

Referring to FIG. 8, in this implementation, router 140 receives the content via the selected network, and then forwards the content to mobile device 150 via hybrid mobile network/broadcast antenna 145 and a wireless connection to mobile device 150. If, as shown in FIG. 8, the selected network is wired network 130, then the content is received (shown with a "1" within a circle) at router 140 from wired network 130, and then forwarded (shown with a "4" within a circle) from router 140 to mobile device 150 via antenna 145 and a mobile network wireless connection. Additionally, if, as further shown in FIG. 8, the selected network is broadcast network 125, then the content is received (shown with a "2" within a circle) at router 140 from network 125, and then forwarded (shown with a "4" within a circle) from router 140 to mobile device 150 via antenna 145 and a mobile network wireless connection. Furthermore, if, as also shown in FIG. 8, the selected network is mobile network 120, then the content is received (shown with a "3" within a circle) at router 140 from network 120, and then forwarded (shown with a "4" within a circle) from router 140 to mobile device 150 via antenna 145 and a mobile network wireless connection.

If the Wi-Fi connection to the user device at router 140 has not been lost and communication between router 140 and the user device via the Wi-Fi connection continues (NO—block 750), then the exemplary process returns to block 725 (FIG. 7A) with the continued forwarding of content via the requested channel to the particular user device over the Wi-Fi connection.

Figure 9B:
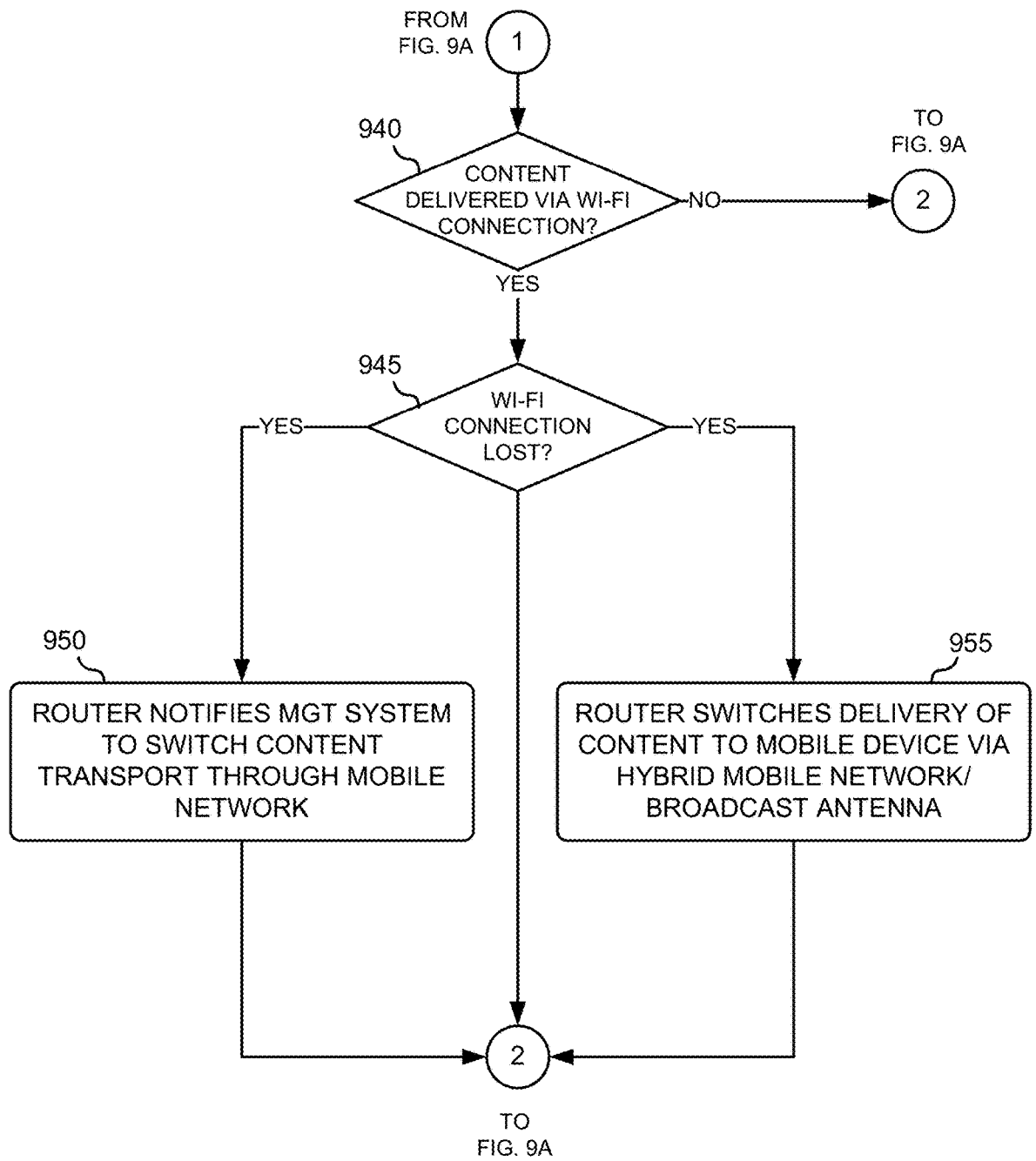

FIGS. 9A and 9B are flow diagrams that illustrate an exemplary process for selecting a content transport network, among multiple content transport networks, and for causing, by router 140, on-demand content to be switched to the selected content transport network for transportation and for forwarding, by router 140, to a destination user device. The exemplary process of FIGS. 9A and 9B may be implemented by router 140.

The exemplary process includes router 140 receiving an on-demand content request from a particular user device connected to router 140 (block 900). Content sources 110 may store content for on-demand access by user devices. A user device connected to router 140, such as a mobile device 150, STB 155, or a computer 160, may send a content request for receiving on-demand content from a content source 110. The content request may identify a particular URL associated with where the on-demand content is stored at content source 110. Router 140 may receive the content request via a wireless LAN connection from a mobile device 150, via a wired connection from STB 155, or via a wired connection from computer 160.

Router 140 selects mobile network 120, broadcast network 125, or wired network 130 as the content transport network based on the requested content and network availability (block 905). The nature of the requested content itself may be a factor in which content transport network router 140 selects. For example, if the content includes high definition video, router 140 may select the network having the highest available bandwidth, or the least cost bandwidth. In the case of content being high definition video, then router 140 may select wired network 130, instead of mobile network 120, since data usage over mobile network 120 may be more expensive than content delivery over wired network 130.

Network availability, at router, may be based on what network connections router 140 has, and/or based on network performance parameters associated with each connected network. If hybrid mobile network/broadcast antenna 145 is connected to router 140, then mobile network 120 and broadcast network 125 may be available to router 140. Additionally, if wired network 130 has a connection to router 140, then wired network 130 may be available to router 140. Availability of a particular one of the connected networks 120, 125, and 130 may be based on whether service of each of the networks is currently available (i.e., no network outages), or based on the current available bandwidth of the connection between each of the networks 120, 125 and 130 and router 140. For example, if congestion exists on the wireless interface between mobile network 120 and router 140 (via antenna 145), then mobile network 120 may be considered as currently unavailable until the congestion is alleviated. As another example, if a network outage exists in wired network 130, then wired network 130 may be considered as currently unavailable until the network outage is resolved.

Router 140 may apply a selection algorithm to determine which network to select. The selection algorithm may take into account current network performance parameters (e.g., bandwidth of each network's connection to router 140), or other factors. Router 140 may additionally receive a message from management system 105 that instructs router 140 to request content according to an optimized transport pattern determined by management system 105 (e.g., in block 615 of FIG. 6). In one implementation, the instructions from management system 105 may explicitly identify which network to currently use for certain types of content. In this implementation, the instructions from management system 105 take precedence over any network selection algorithm performed by router 140. In another implementation, the instructions from management system 105 may include a set of rules that router 140 should apply for determining which of networks 120, 125 or 130 to select for transport of the requested content. The set of rules may take precedence over any network selection algorithm performed by router 140, or may be used in conjunction with any network selected algorithm performed by router 140.

Router 140 sends a content request to the content source 110, or to the management system 105, with an indication of the selected content transport network (block 910). Router 140 may essentially forward the content request from the user device to the content source 110 and/or to management system 105, with the addition of an identification of the network 120, 125, or 130 over which the content should be transported. If router 140 sends the content request to management system 105, management system 105 may receive the content request, instruct appropriate routing nodes 170 regarding routing content to the requesting user device from the content source, and forward the content request on to the content source 110. Upon receipt of the content request, content source 110 may retrieve the content using the URL and may, for example, stream the content to the requesting user device using a streaming media protocol.

Router 140 receives the requested content via the selected content transport network (block 915). Referring to FIG. 1C, respective routing nodes 170 route the content from the content source to the router 140 via the selected one of networks 120, 125 and/or 130. Router 140 forwards the requested content to the particular user device via an appropriate connection at the router 140 (block 920). Upon receipt of the content from the content source 110 via the selected one of networks 120, 125 and/or 130, router 140 forwards the content over the wired or wireless connection from router 140 to the particular user device. For example, if mobile device 150 has requested the content, router 140 forwards the content over the wireless LAN (e.g., Wi-Fi) connection between router 140 and mobile device 150. As another example, if STB 155 has requested the content, router 140 forwards the content over the wired connection between router 140 and STB 155. As a further example, if computer 160 has requested the content, router 140 forwards the content over the wired LAN connection between router 140 and STB 155.

Router 140 determines if the connection to the selected network has been lost (block 925). For example, if the selected network is mobile network 120, then the connection between mobile network 120 and router 140 may be lost (e.g., due to inadequate mobile network signal strength), or may be dropped. As another example, if the selected network is broadcast network 125, then insufficient signal strength, or signal interference, may result in a loss of broadcast signal (e.g., broadcast TV signal), representing a loss of connection. As a further example, is the selected network is wired network 130, then a network outage at optical fiber network 130 may result in a loss of connection with router 140.

If the router connection to the selected network has been lost (YES—block 925), then router 140 selects an alternate content transport network from the remaining available networks (block 930), and router 140 notifies management system 105 to switch the content transport of the selected content via the alternate network (block 935). For example, if the selected network was broadcast network 125, and the connection to antenna 145 and router 140 was lost, then router 140 may select an alternate network from either mobile network 120 or wired network 130. In an implementation in which wired network 130 is not connected to router 140, then router 140 may select mobile network 120 for continuing the transport of the content to the requesting user device. Upon receipt of the notification from router 140, management system 105 may instruct the content source 110 and appropriate routing nodes 170 to re-route the content via the selected alternate network. The exemplary process then returns to block 915 with the continued receipt of the requested content at router 140.

If the router connection to the selected network has not been lost (NO—block 925), then router 140 determines if the content is being delivered to the user device via a Wi-Fi connection at router 140 (block 940). The content requesting user device may be, for example, mobile device 150, and mobile device 150 may have been receiving the content via a wireless LAN connection (e.g., Wi-Fi connection) from router 140 to mobile device 150. For example, the requested content may be transported via broadcast network 125 to antenna 145 and router 140, and then forwarded from router 140 to mobile device 150 via the Wi-Fi connection between router 140 and mobile device 150. As another example, the requested content may be transported via mobile network 120 to antenna 145 and router 140, and then forwarded from router 140 to mobile device 150 via the Wi-Fi connection between router 140 and mobile device 150.

If the content is not being delivered to the user device via a Wi-Fi connection at router 140 (NO—block 940), then the exemplary process returns to block 915 with the continued receipt of the requested content at router 140. In a first implementation, if the content is being delivered to the user device via a Wi-Fi connection at router 140 and the Wi-Fi connection has been lost (left-side "YES"—block 945), then router 140 notifies management system 105 to switch content transport through mobile network 120 (block 950). Referring to FIG. 1C, upon receipt of the notification from router 140, management system 105 may instruct routing node 170-1 and routing node 170-2 to switch the content transport from content network(s) 115 to mobile network 120, and directly to the mobile device 150.

In a second implementation, if the content is being delivered to the user via a Wi-Fi connection and the Wi-Fi connection has been lost (right-side "YES"—block 945), then router 140 switches delivery of the content to the user device (e.g., mobile device 150) via hybrid mobile network/broadcast antenna 145 (block 955). Referring to FIG. 8, in this implementation, router 140 receives the content via the selected network, and then forwards the content to mobile device 150 via hybrid mobile network/broadcast antenna 145 and a mobile network wireless connection (e.g., 5G wireless connection) to mobile device 150. If, as shown in FIG. 8, the selected network is wired network 130, then the content is received (shown with a "1" within a circle) at router 140 from wired network 130, and then forwarded (shown with a "4" within a circle) from router 140 to mobile device 150 via antenna 145 and a mobile network wireless connection. Additionally, if, as further shown in FIG. 8, the selected network is broadcast network 125, then the content is received (shown with a "2" within a circle) at router 140 from network 125, and then forwarded (shown with a "4" within a circle) from router 140 to mobile device 150 via antenna 145 and a mobile network wireless connection. Furthermore, if, as also shown in FIG. 8, the selected network is mobile network 120, then the content is received (shown with a "3" within a circle) at router 140 from network 120, and then forwarded (shown with a "4" within a circle) from router 140 to mobile device 150 via antenna 145 and a mobile network wireless connection. Subsequent to either of blocks 950 or 955, the exemplary process returns to block 915 with the continued receipt of the requested content at router 140.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 6, 7A, 7B, 9A, and 9B, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and the type of information. Storage and use of personal information may be in an appropriately secure manner reflective of the type of information, for example, through various encryption and anonymization techniques for particularly sensitive information.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a router at a subscriber location, a request for content from a user device connected to the router at the subscriber location;
receiving, by the router, an instruction, from a management system not at the subscriber location, to select a first network from a plurality of networks to which the router is connected, wherein the plurality of networks comprise at least a broadcast television (TV) network and a mobile network, wherein the router is connected to the broadcast TV network and the mobile network via a hybrid mobile network/broadcast TV antenna located at the subscriber location, wherein the hybrid mobile network/broadcast TV antenna includes a mobile network antenna comprising one or more arrays of antenna elements coupled to a broadcast TV antenna, wherein the hybrid mobile network/broadcast TV antenna connects to the broadcast TV network via the broadcast TV antenna, and wherein the hybrid mobile network/broadcast TV antenna connects to the mobile network via the mobile network antenna;
selecting, by the router, the first network from the plurality of networks in accordance with the instruction;
receiving, by the router, the requested content via the first network; and
forwarding, from the router, the requested content to the user device via a wireless or wired connection between the router and the user device.

2. The method of claim 1, wherein the selecting, by the router, is based on current network performance parameters associated with the plurality of networks.

3. The method of claim 1, wherein the user device connects to the router via a wireless local area network (LAN) connection and wherein the method further comprises:
determining if the wireless LAN connection between the router and the user device has been lost; and
notifying, if the wireless LAN connection has been lost, the management system to switch the requested content through the mobile network directly to the user device.

4. The method of claim 1, wherein the user device connects to the router via a wireless local area network (LAN) connection, and wherein the method further comprises:
determining if the wireless LAN connection between the router and the user device has been lost; and
switching, if the wireless LAN connection has been lost, delivery of the requested content from the router to the user device via the hybrid mobile network/broadcast TV antenna.

5. The method of claim 1, wherein the user device connects to the router at the subscriber location via either a wireless local area network (LAN) connection or a wired LAN connection.

6. The method of claim 1, wherein the requested content comprises live content and wherein the method further comprises:
determining the plurality of networks as networks having network connections to the router and currently being available to the router for content transport; and
determining which of the plurality of networks has availability of a channel associated with the requested content,
wherein the selecting, by the router, the first network from the plurality of networks is based on the determination of which of the plurality of networks has the availability of the channel.

7. The method of claim 1, wherein the requested content comprises on-demand content and wherein the method further comprises:
determining the plurality of networks as networks having network connections to the router and currently being available to the router for content transport,
wherein the selecting, by the router, the first network from the plurality of networks is based on the determination of which of the plurality of networks as currently being available for the content transport.

8. The method of claim 1, wherein the plurality of networks further comprises a wired broadband network.

9. The method of claim 8, wherein the wired broadband network comprises an optical fiber network associated with a network service provider that provides a fiber-to-the-premises (FTTP) telecommunications service to the subscriber location.

10. The method of claim 1, further comprising:
receiving, by the router, a message from the management system that includes instructions for the router to request transport of the content according to optimized content transport patterns determined by the management system.

11. A system, comprising:
a hybrid mobile network/broadcast television (TV) antenna for receiving content via a broadcast TV network and for receiving content via a mobile network, wherein the hybrid mobile network/broadcast TV antenna is located at a subscriber location, wherein the hybrid mobile network/broadcast TV antenna includes a mobile network antenna comprising one or more arrays of antenna elements coupled to a broadcast TV antenna, wherein the hybrid mobile network/broadcast TV antenna connects to the broadcast TV network via the broadcast TV antenna, and wherein the hybrid mobile network/broadcast TV antenna connects to the mobile network via the mobile network antenna; and
a routing device at the subscriber location and connected to the broadcast TV network and the mobile network via the hybrid mobile network/broadcast TV antenna at the subscriber location, the routing device comprising:
a first communication interface configured to connect to the hybrid mobile network/broadcast TV antenna,
a second communication interface configured to connect to at least one user device and to receive a request for content from the at least one user device, and
a processing unit configured to:
receive an instruction, from a management system not at the subscriber location, to select a first network from a plurality of networks to which the routing device is connected, wherein the plurality of networks includes the broadcast TV network and the mobile network, and wherein the selected first network comprises either the broadcast TV network or the mobile network, and select the first network from the plurality of networks in accordance with the instruction,
wherein the first communication interface is further configured to receive the requested content via the selected first network, and
wherein the processing unit is further configured to forward the requested content to the at least one user device via the second communication interface.

12. The system of claim 11, wherein the second communication interface comprises a wireless interface that implements a wireless local area network (LAN).

13. The system of claim 12, wherein the at least one user device connects to the routing device via the wireless LAN, and wherein the processing unit is further configured to:
determine if a wireless LAN connection between the routing device and the at least one user device has been lost; and
notify, if the wireless LAN connection has been lost, the management system to switch the requested content through the mobile network directly to the at least one user device.

14. The system of claim 12, wherein the at least one user device connects to the routing device via the wireless LAN, and wherein the processing unit is further configured to:
determine if a wireless LAN connection between the routing device and the at least one user device has been lost; and
switch, if the wireless LAN connection has been lost, delivery of the requested content from the routing device to the at least one user device via the hybrid mobile network/broadcast TV antenna.

15. The system of claim 11, wherein the requested content comprises live content, and wherein the processing unit is further configured to:
determine the plurality of different networks as networks having network connections to the routing device and currently being available to the routing device for content transport; and
determine which of the plurality of different networks has availability of a channel associated with the requested content.

16. The system of claim 11, wherein the requested content comprises on-demand content, and wherein the processing unit is further configured to:
determine the plurality of networks as networks having network connections to the routing device and currently being available to the routing device for content transport.

17. A non-transitory storage medium storing instructions executable by a routing device at a subscriber location, wherein the instructions comprise instructions to cause the routing device to:
receive a request for content from a user device connected to the routing device,
receive a message, from a management system not at the subscriber location, that includes instructions for the routing device to request transport of the content according to optimized content transport patterns determined by the management system,
select a first network from a plurality of networks to which the routing device is connected based on the instructions, wherein the plurality of networks comprises at least a broadcast television (TV) network and a mobile network, wherein the routing device is connected to the broadcast TV network and the mobile network via a hybrid mobile network/broadcast TV antenna, wherein the hybrid mobile network/broadcast TV antenna includes a mobile network antenna comprising one or more arrays of antenna elements coupled to a broadcast TV antenna, wherein the hybrid mobile network/broadcast TV antenna connects to the broadcast TV network via the broadcast TV antenna, and wherein the hybrid mobile network/broadcast TV antenna connects to the mobile network via the mobile network antenna,
send, to the management system, a content request for the requested content and an indication that the requested content is to be transported via the first network,
receive the requested content via the first network, and
forward the requested content to the user device via a wireless or wired connection between the routing device and the user device.

18. The non-transitory storage medium of claim 17, wherein the plurality of networks comprises the broadcast TV network, the mobile network, and a wired broadband network, and
wherein the selected first network comprises one of the broadcast TV network, the mobile network, or the wired broadband network.

19. The non-transitory storage medium of claim 18, wherein the wired broadband network comprises an optical fiber network associated with a network service provider that provides a fiber-to-the-premises (FTTP) telecommunications service.

20. The non-transitory storage medium of claim 17, wherein the requested content comprises live content or on-demand content, and wherein the instructions further comprise instructions to cause the routing device to:
determine the plurality of networks as networks having network connections to the routing device and currently being available to the routing device for content transport; and
determine, if the requested content is live content, which of the plurality of networks has availability of a channel associated with the requested content,
wherein the selecting the first network from the plurality of networks is based on the determination of which of the plurality of networks has the availability of the channel, or based on which of the plurality of networks as currently being available for the content transport.

\* \* \* \* \*